United States Patent [19]

Renger

[11] Patent Number: 5,095,224
[45] Date of Patent: Mar. 10, 1992

[54] INTERRUPTED RESONANCE ENERGY TRANSFER SYSTEM

[75] Inventor: Herman L. Renger, Sollentuna, Sweden

[73] Assignee: Siemens-Pacesetter, Inc., Sylmar, Calif.

[21] Appl. No.: 575,924

[22] Filed: Aug. 31, 1990

[51] Int. Cl.$^5$ .......................... H03K 3/57; H03K 5/145
[52] U.S. Cl. .................................. 307/270; 307/268; 328/67; 328/223; 310/319
[58] Field of Search ............... 307/270, 271, 261, 246, 307/308, 268; 328/67, 113, 123; 310/314, 316, 319, 321, 323

[56] References Cited

U.S. PATENT DOCUMENTS

| | | | |
|---|---|---|---|
| 3,166,718 | 1/1965 | Zyskowski | 328/183 |
| 3,360,732 | 12/1967 | Haugh et al. | 328/223 |
| 3,391,345 | 7/1968 | Burgert | 329/138 |
| 4,345,604 | 8/1982 | Renirie | 128/419 PS |
| 4,489,370 | 12/1984 | Migliori | 363/26 |
| 4,584,499 | 4/1986 | Leskovec et al. | 310/319 |
| 4,654,574 | 3/1987 | Thaler | 320/14 |
| 4,675,796 | 6/1987 | Gautherin et al. | 363/20 |
| 4,694,387 | 9/1987 | Walker | 363/56 |
| 4,743,789 | 5/1988 | Puskas | 310/316 |
| 4,829,415 | 5/1989 | Haferl | 363/26 |

FOREIGN PATENT DOCUMENTS 9573810 9/1982 U.S.S.R. .
2025166 1/1980 United Kingdom .

*Primary Examiner*—John Zazworsky
*Attorney, Agent, or Firm*—Malcolm J. Romano; Leslie S. Miller

[57] ABSTRACT

A drive circuit for applying a supply voltage to a sending coil provides resonant coupling of the sending coil with the target coil regardless of changes in the inductance of the sending coil, as long as the resonant frequency of the sending coil is greater than the resonant frequency of the target coil. A controller provides variable delay intervals in the application of the supply voltage, thereby compensating for changes in the sending coil's inductance with the passage of time and proximity effects. The controller examines the reflected voltage induced in the sending coil by changing currents in the target coil to examine the degree of resonant coupling between the two coils and correct any mistuning.

26 Claims, 4 Drawing Sheets

INTERRUPTED RESONANCE ENERGY TRANSFER SYSTEM

BACKGROUND OF THE INVENTION

1. Field of the Invention

This invention relates generally to electrical energy transfer circuits and, more particularly, to circuits for driving an inductive element with an applied voltage at a tuned frequency.

2. Description of the Related Art

It is often necessary to inductively transfer electrical power from one device to another, such as when a charging device is used for recharging a target device's batteries. Each device includes a coil, and the electrical power is inductively transferred from the coil in the charging device typically to the coil in the target device and then to the batteries. To maximize the transfer of energy to the target device's coil, and therefore maximize the rate at which the batteries will be recharged, while also minimizing the energy lost as heat, the coil circuit in the target device typically is tuned by using a capacitor to counteract the reactive impedance of the coil. The coil and capacitor of the target device form an L-C circuit whose impedance will be minimized at the L-C circuit's resonant frequency. Using capacitive tuning to minimize the heat generated by recharging is especially important where the target device will be implanted in a body, such as a heart pacemaker or drug pump, because a rise in the implanted device's temperature of even a few degrees Fahrenheit can cause damage to healthy tissue.

The resonant frequency of the target coil circuit will be determined by the coil inductance, the capacitance, and the physical orientation of the various components and their proximity to other conductors. While the inductance of a coil is largely determined by the size of the coil and the number of coil turns used, the inductance of a coil will be decreased as it is brought into proximity with other conductors. An implanted device, such as a heart pacemaker, is typically contained in a conductive case, and therefore its coil has a relatively stable inductance once encased regardless of any other conductors that are moved nearby. Thus, the resonant frequency of the implanted coil circuit will not appreciably change as the external sending coil of the recharging device is brought close by.

Having fixed the target coil's resonant frequency, maximum inductive coupling is achieved by configuring the recharging device's coil to have the same frequency. That is, the recharging device's coil circuit should generate a field having a fundamental frequency equal to the resonant frequency of the target device's coil circuit. The inductance of the sending coil, and therefore the frequency of its generated field, can change as it is moved close to the case of the target device for recharging. This alters the coupling between the sending coil and the target coil, decreasing the energy transfer and resulting in increased heat generation.

The inductance of a coil can also be changed with the passage of time. Even when new, there is typically a slight variation in the inductance from coil to coil due to manufacturing tolerances. Thus, it is not uncommon to find that the coupling between the sending coil and the target coil is not optimal. This wastes energy, increases the recharging time, and can pose a health risk from heating.

From the discussion above, it should be apparent that there is a need for an energy transfer system for inductively transferring power from an external sending coil to an implanted target coil while maintaining resonant coupling between the coils. The present invention satisfies this need.

SUMMARY OF THE INVENTION

The present invention provides an energy transfer system in which the fundamental magnetic field frequency produced by a sending coil circuit with a sending coil and capacitive element can be matched to the resonant frequency of a circuit comprising a target coil and a capacitive element, regardless of variations in the inductance of the sending coil, as long as the resonant frequency of the sending coil circuit is greater than that of the target coil circuit. This increases the coupling of energy from the sending coil to the target coil, maximizing the amount of energy transferred, while still maintaining the coupling of the two coils at the resonant frequency of the target coil circuit, minimizing the amount of energy lost as heat.

The energy transfer system maintains resonant coupling by cyclically transferring energy from a supply voltage source to the sending coil and a capacitor connected in series, thereby producing a cyclic voltage and current. A cyclic drive signal begins the voltage and current cycle for the coil and capacitor, which together comprise an L-C circuit. The sending coil and the capacitor are allowed to go through only one-half of their voltage-current cycle before the cycle is momentarily paused, or maintained at a steady state, at the moment of peak coil current. During this pause, energy is stored in the sending coil. After an appropriate waiting time interval, the second half of the cycle is completed as the coil current decreases to zero and then flows in the opposite direction. The cycle time of the drive signal is a predetermined time interval selected such that the sending coil current frequency is at least as great as the resonant frequency of the target coil circuit. The sending coil current is held at its peak value during the waiting time contained within the predetermined cycle time. In this way, the sending coil is driven resonantly to produce a coil current, and therefore a magnetic field, having a fundamental frequency equal to the resonant frequency of the target coil circuit and below the natural resonant frequency of the sending coil circuit. The predetermined drive signal cycle time is independent of the resonant frequency of the sending coil circuit, and therefore the predetermined cycle time can be selected to produce a sending coil field having a frequency equal to the resonant frequency of the target coil circuit regardless of minor variations in the sending coil circuit resonant frequency.

In another aspect of the present invention, the operating frequency of the system is adjusted to match the resonant frequency of the target coil circuit despite changes in the resonant frequency of the coil-capacitor circuit over time. For example, if the resonant frequency of the sending system changes as it is brought close to the target device, then the system will adjust the frequency of the produced field such that it is equal to that of the target circuit to maintain resonant coupling. In addition to halting, or pausing, in the cyclic voltage and current of the sending coil circuit, the system adds another pause in the cycle when the sending coil current goes through zero current as it changes direction. When the current of the sending coil reaches zero current, the system disconnects the supply voltage source from the sending coil circuit, placing the circuit in a waiting time interval, and examines the reflected voltage coming from the target device. This waiting time interval comprises a window during which the voltage generated by the reflected power can be checked. Any phase error indicates that the two circuits are not optimally coupled. The cycle time interval can be adjusted until the phase error detected during the window period is substantially zero.

A controller is provided to respond to the differences in system voltage. The windows are used to examine the reflected voltage, while the controller adjusts the delay time to achieve optimum resonant coupling between the devices. In this way, the system compensates for the changing inductance of the sending coil circuit as it is brought close to the target device, and also compensates for changes in the target circuit resonant frequency.

Other features and advantages of the present invention will become apparent from the following detailed description, taken in conjunction with the accompanying drawings, which illustrate by way of example, the principles of the invention.

Description of the Preferred Embodiment

Figure 1:
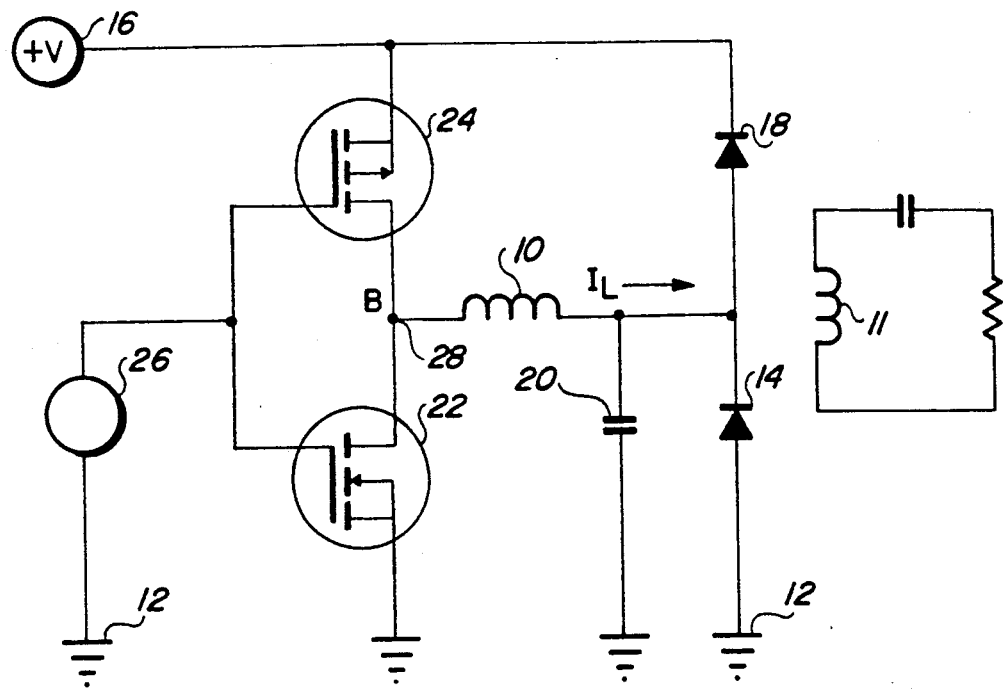
FIG. 1 is a schematic diagram of a drive circuit in accordance with the present invention.

A resonant energy transfer system in accordance with the present invention is illustrated in FIG. 1, in which a sending coil 10 is used to transfer electrical energy to a target coil 11. For example, the receiving coil can be part of an implanted heart pacemaker having rechargeable batteries. The circuit provides maximum inductive coupling of the two coils while producing a minimum of heat, thereby reducing the recharging time and decreasing the health risk associated with warming of the pacemaker. The circuit illustrated in FIG. 1 operates such that the frequency of the field produced by the sending coil 10 is equal to the resonant frequency of the target coil 11 circuit.

The sending coil 10 is connected at one end to a reference potential 12, such as ground, via a first diode 14, and to a supply voltage source 16 via a second diode 18. The supply voltage source produces a voltage having a magnitude of $+V$. One lead of a capacitor 20 is connected between the sending coil and the first diode, and the other lead of the capacitor is connected to the reference potential. Two transistors, a first transistor 22 and a second transistor 24, alternately connect the coil to the supply voltage source and to the reference potential. The first transistor is an n-channel, or NMOS-type transistor, and the second transistor is a p-channel, or PMOS-type transistor. Other transistor types, however, can be used. The gate terminal of each transistor is driven by a voltage from a drive voltage source 26. The drain terminal of each transistor is connected to the sending coil 10 at a junction point 28. The source terminal of the first transistor is connected to the reference potential, while the source terminal of the second transistor is connected to the supply voltage source 16. The drive signal produced by the drive voltage source 26 has a predetermined cycle time that is equal to that of the target circuit. That is, the frequency of the drive signal is equal to the resonant frequency of the target coil circuit.

Figure 2:
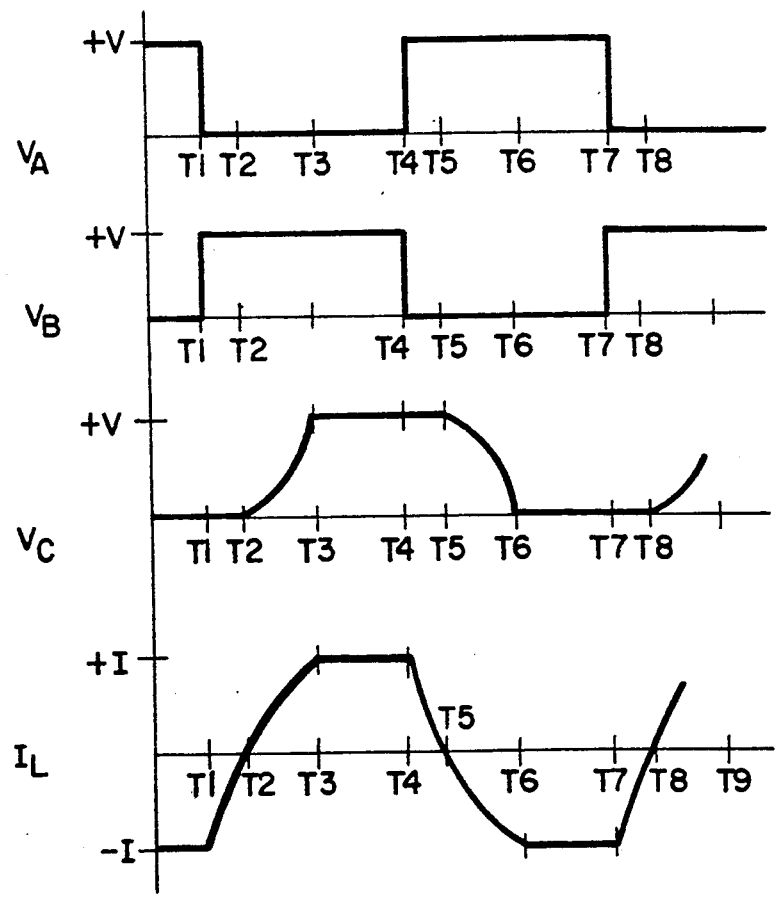
FIG. 2 is a timing diagram for various waveforms of the drive circuit illustrated in FIG. 1.

The operation of the FIG. circuit is best understood with reference to the timing diagram illustrated in FIG. 2, which illustrates the drive voltage $V_A$, the voltage $V_B$ of the junction point 28, the voltage $V_c$ of the capacitor 20, and the current $I_L$ through the sending coil 10. Initially, just before time T1, the drive voltage $V_A$ is high, and therefore the first transistor 22 is in a conducting state, or is biased on, while the second transistor 24 is in a nonconducting state, or is biased off. A negative current has been flowing in the circuit before the time T1, and the capacitor has no energy stored. Thus, the capacitor voltage $V_c$ before time T1 is at zero. At time T1, the a conducting state, or biasing it on.

Once the drive voltage $V_A$ drops, the voltage $V_C$ on the capacitor 20 is initially at zero. Because the second transistor 24 is conducting at time T1, the opposite lead of the sending coil 10 is at the supply voltage level $+V$. Thus, at time T1 a positive voltage has been placed across the coil, opposing the flow of current. Therefore, the coil current $I_L$ begins changing to an opposite polarity, changing from negative toward positive. The voltage on the first diode 14 however, remains at zero while the diode is conducting, and therefore the capacitor voltage $V_c$ remains at zero. Once the coil current $I_L$ reaches zero, it reverses and becomes positive. The capacitor voltage waveform begins rising in a generally sinusoidal curve toward the supply voltage level $+V$ because the second lead of the sending coil is at that level.

As long as the sending coil current $I_L$ is flowing in the negative direction, the current flows through the first diode 14. When the coil current reaches zero, at time T2, the capacitor voltage $V_c$ that was clamped to ground by the first diode is free because the first diode opens. That is, the first diode cannot conduct current in the opposite (positive) direction. At that time, time T2, the positive current begins charging the capacitor 20. As the voltage $V_c$ across the capacitor increases, the voltage across the coil 10 decreases, and therefore the rate of increase of the coil current decreases. Once the capacitor voltage $V_c$ reaches the supply voltage $+V$ level, the rate of increase for the coil current becomes zero. That is, the coil has a current flowing through it but a zero voltage across it. Thus, the second transistor 24 is biased on, but there is nothing to increase the current through the coil. At this point, at time T3, the second diode 18 begins to conduct. Therefore, the coil current $I_L$ stays constant until the transistors 22 and 24 are switched again. The capacitor voltage $V_c$ stays constant because it is clamped to the supply voltage $+V$ by the second diode 18.

The time interval during which the capacitor voltage $V_c$ remains at zero, from time T1 to time T2, is approximately equal to the square root of the inductance multiplied by the capacitance, divided by two. During this interval, the change in inductor current is approximately linear. The time interval during which the capacitor voltage $V_c$ rises toward the supply voltage level $+V$, from time T2 to time T3, is approximately equal to the constant PI multiplied by the square root of the inductance multiplied by the capacitance, all divided by two. The foregoing may be represented by the following mathematical equation, wherein the interval $$T2 - T3 = \frac{\pi \sqrt{LC}}{2} \quad \text{where PI} = \pi = 3.1415.$$

During this time interval, the capacitor voltage $V_c$ waveform has a generally sinusoidal shape, as shown in FIG. 2.

At time T4, the drive voltage $V_A$ again goes high, placing the first transistor 22 in a conducting state and placing the second transistor 24 in a non-conducting state. The voltage supply source 16 is now working against the current flowing through the sending coil 10, which is flowing in the positive direction with the second diode 18 conducting. Because the first transistor 22 is in a conducting state, the current through the sending coil will be in the opposite polarity from the supply voltage, proceeding from the first transistor 22, through the sending coil 10, through the second diode 18, and up to the supply voltage source 16. That is, at this point, energy from the coil is being released back into the supply voltage source. The sending coil current is decreasing linearly because the supply voltage $+V$ across the coil during this time is not changing and is not charging the capacitor. Rather, the voltage is against the flow of current and is decreasing the current. This time interval, from time T4 to T5, is approximately equal to the time interval from time T1 to T2.

When the current through the sending coil 10 reaches zero at time T5, the second diode 18 turns off, and therefore the energy in the capacitor 20 can be transferred into the circuit. The capacitor will transfer its energy into the coil because the first transistor 22 is still conducting current through the ground 12, and therefore, the shape of the waveform from time T5 to T6 will be sinusoidal in the same manner as the waveform from the first half-cycle of the voltage period, from time T2 to T3. Thus, the capacitor voltage $V_c$ begins at a constant level at time T4 and then curves down in a sinusoidal fashion at time T5 until it reaches zero at time T6, the current through the sending coil meanwhile changing linearly from its maximum positive value at time T4, to zero, to its maximum negative value at time T6. The current through the coil 10 becomes more negative from time T4 to T6 because the right hand side of the coil has the supply voltage charge $+V$ from the capacitor 20 initially, and the left hand side has a short to ground 12 through the first transistor 22. When the coil current $I_L$ reaches its peak negative value, the condition of the circuit again corresponds to that just before time T1.

In the circuit illustrated in FIG. 1, the sending coil 10 and capacitor 20 are selected so as to comprise an L-C circuit having a resonant frequency at least as high as that of the target coil circuit. The half-cycle time of the drive voltage $V_A$ can be selected to be approximately equal to half the cycle time for the resonant frequency of the target coil 11 circuit. As can be seen in FIG. 2, the half-cycle time of the voltage and current in the sending circuit is independent of the resonant frequency of the circuit. Thus, the time interval from time T1 to time T4 can be predetermined to match the half-cycle time of the target coil 11 resonant frequency regardless of changes in the sending coil 10 inductance, as long as the resonant frequency of the circuit is above that of the target coil circuit. In this way, the cyclic voltage and current in the sending coil circuit will be in resonance with the target coil circuit. That is, the waiting time interval from time T3 to time T4 and from time T6 to time T7 will each be a waiting time interval to ensure resonant coupling between the two coils.

Figure 3:
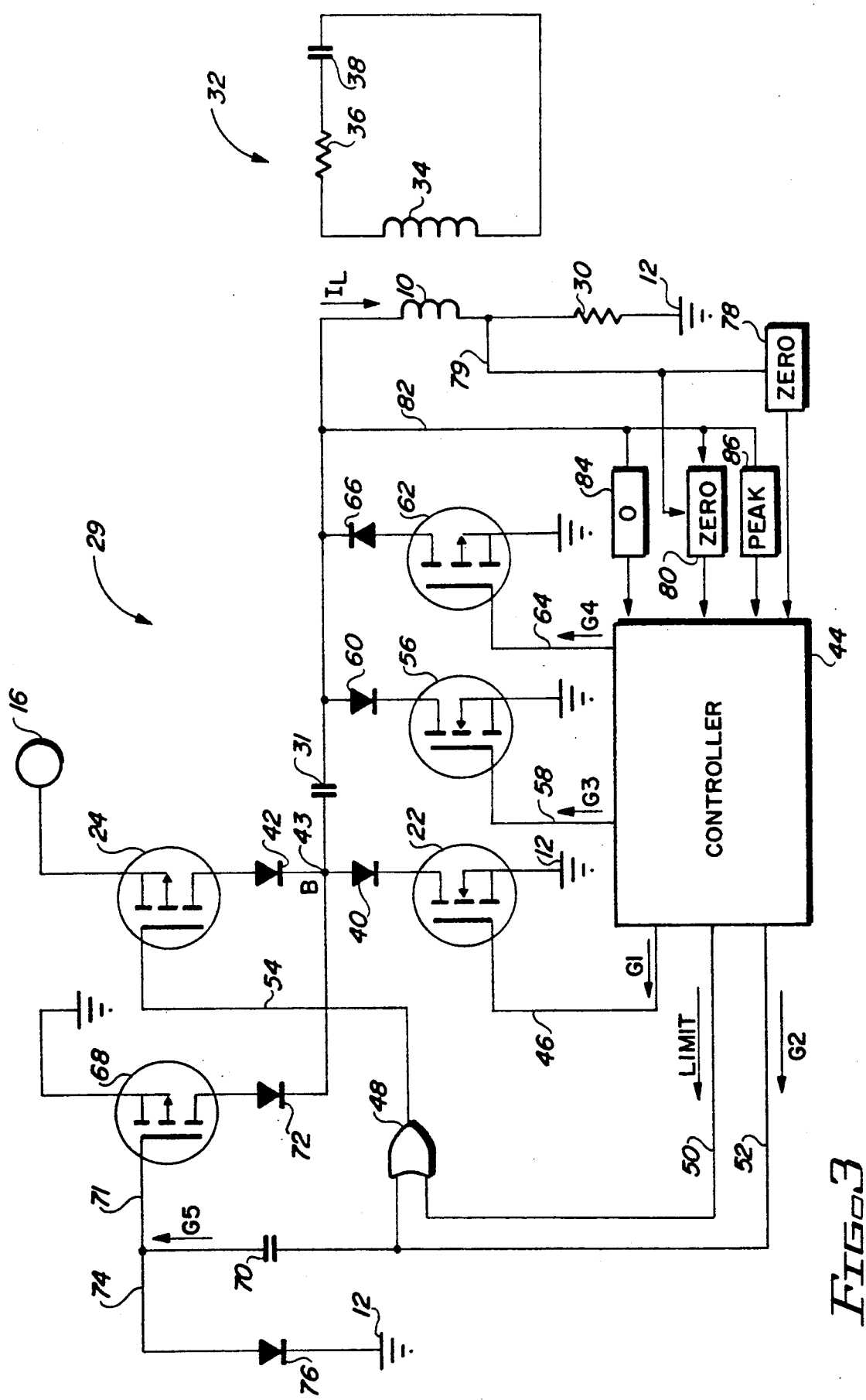
FIG. 3 is a schematic diagram of a drive circuit of the type illustrated in FIG. 1, further incorporating a peak controller.

In another embodiment of the invention, shown in FIG. 3, a second waiting time interval is added. The first waiting time interval described above with respect to FIGS. 1 and 2 ensures resonant coupling between the two coils despite changes in the sending coil's inductance, because the waiting time interval contained within the drive signal cycle time can accommodate changes while the cycle time remains fixed, and allows energy to be stored in the coil. The embodiment illustrated in FIG. 3 also includes a first waiting time interval during which energy is stored, and also includes a second waiting time interval. The added second waiting time interval is used as a window during which the very small reflected voltage induced in the sending coil by the target coil is examined. This allows precise determination of the degree of matching between the two circuits. If the voltage waveform indicates that resonant coupling has been lost, the first waiting time interval can be adjusted until the waveform indicates that resonant coupling is achieved.

A drive circuit 29 is shown in FIG. 3 in which, as with the previous embodiment of FIG. 1, the sending coil 10 is alternately connected either to a reference potential 12, such as ground, or to a supply voltage source 16 via a first transistor 22 or a second transistor 24, respectively. The sending coil is connected to ground via a sensing resistor 30. A capacitor 31 is connected in series to the coil 10, and the two comprise an L-C circuit having a resonant frequency and producing a cyclic voltage and current flow. The cyclic voltage and current are produced in conjunction with the first waiting time interval, or delay, that can be tuned such that the voltage and current cycles have a frequency substantially equal to the resonant frequency of a target device 32 having a target coil 34 connected in series with a resistor 36 and a capacitor 38. That is, in the FIG. 3 circuit the delay interval is again used to match the half-cycle time of the cyclic voltage and current of the drive circuit 29 to the half-cycle time of the resonant frequency of the target device 32. The added second waiting time interval, or window, is used to disconnect the sending coil 10 from the first and second transistors and to allow the very small reflected voltage from the target coil to be compared to the voltage of the sending coil. A phase error in the reflected voltage indicates that the two coils 10 and 34 are not resonantly coupled. There can be a phase shift in the target voltage waveform from what would otherwise be expected due to an intervening conductor, such as the pacemaker case as noted above, and therefore a phase error will not necessarily be present whenever there is a phase difference. Therefore, the particular configuration of the system will determine the amount of phase difference expected and therefore the presence of a phase error.

The two transistors 22 and 24 advantageously comprise MOSFET-type transistors of opposite polarity, the first transistor being an n-channel MOSFET and the second transistor being a p-channel MOSFET. The drain terminals of the first and second transistors are connected to the capacitor 31 by first and second diodes 40 and 42, respectively. The diodes are connected at a common junction point 43 labeled B. The source terminal of the second transistor 24 is connected to the voltage supply source 16. The source terminal of the first transistor 22 is connected to the reference potential 12, or ground.

A controller 44 controls the alternating connection of the sending coil 10 with the supply voltage source 16 and the reference voltage 12. The controller includes a variable oscillator and a pulse generator for producing the various drive signals. The controller is connected to the first transistor 22 via a line 46 over which the controller sends a drive signal G1. When the drive signal G1 is high, the first transistor is placed in a conducting state, or is biased on, thereby connecting the junction 43 to the reference potential or a negative voltage. The controller is connected to the gate terminal of the second transistor 24 through an OR-gate 48. One lead of the OR-gate is connected to the controller via a line 50 over which the controller sends a LIMIT signal indicating that a desired voltage limit has been reached. The second lead of the OR-gate is connected to the controller via a line 52 over which the controller sends a drive signal G2. The OR-gate, in turn, is connected to the gate terminal of the second transistor via a line 54. If either the LIMIT signal or the G2 driving signal is high, the second transistor is placed in a non-conducting state, or is biased off.

Two additional transistors are provided in the circuit 29 for performing a shorting function, as will be described in more detail below. The controller 44 is connected to the gate terminal of a third transistor 56 via a line 58 over which the controller sends a drive signal G3. The third transistor is connected between the sending coil 10 and the capacitor 31 at its drain terminal via a third diode 60. The controller is connected to the gate terminal of a fourth transistor 62 via a line 64, over which the controller sends a drive signal G4, and is connected between the coil and the capacitor at its drain terminal via a fourth diode 66. The third transistor is preferably an n-channel transistor, while the fourth transistor is preferably a p-channel transistor. The third and fourth transistors periodically short the sending coil to ground to allow the current to idle, as described in more detail below.

A fifth transistor 68 is provided for control of the maximum output voltage produced by the circuit 29. A gate terminal of the fifth transistor receives a control signal G5 comprising the G2 drive signal from the controller 44 received via the line 52 and connected to the fifth transistor through a coupling capacitor 70 via a line 71. The coupling capacitor shifts the voltage level of the G2 signal, thereby creating the G5 signal. That is, the G2 signal varies from the supply voltage $+V$ to the reference potential zero, while the G5 signal varies from the reference potential to negative supply, $-V$. The fifth transistor is preferably of the same polarity as the second transistor 24. Thus, when the drive signal G2 is high, the fifth transistor is placed in a non-conducting state, or is biased off. The drain terminal of the fifth transistor is connected to the common junction point 43 via a fifth diode 72. The coupling capacitor and gate terminal of the fifth transistor are also connected to ground 12 via a line 74 and a sixth diode 76.

The controller 44 receives input signals from zero crossing detectors and a phase detector. A first zero crossing detector 78 provides its output to the controller and is connected at its input between the sending coil 10 and the sensing resistor 30 via a line 79. A second zero crossing detector 80 provides its output to the controller, and is provided with a first input from a line 82 connected between the coil 10 and the capacitor 31 and a second input from the line 79. A phase detector 84 provides its output to the controller, and is connected at its input between the coil and the capacitor by the line 82. Finally, a peak detector 86 provides its output to the controller, and is connected to the drive circuit via the line 82 between the coil and capacitor. The peak detector limits the magnitude of the voltage and current produced by the circuit.

Figure 4:
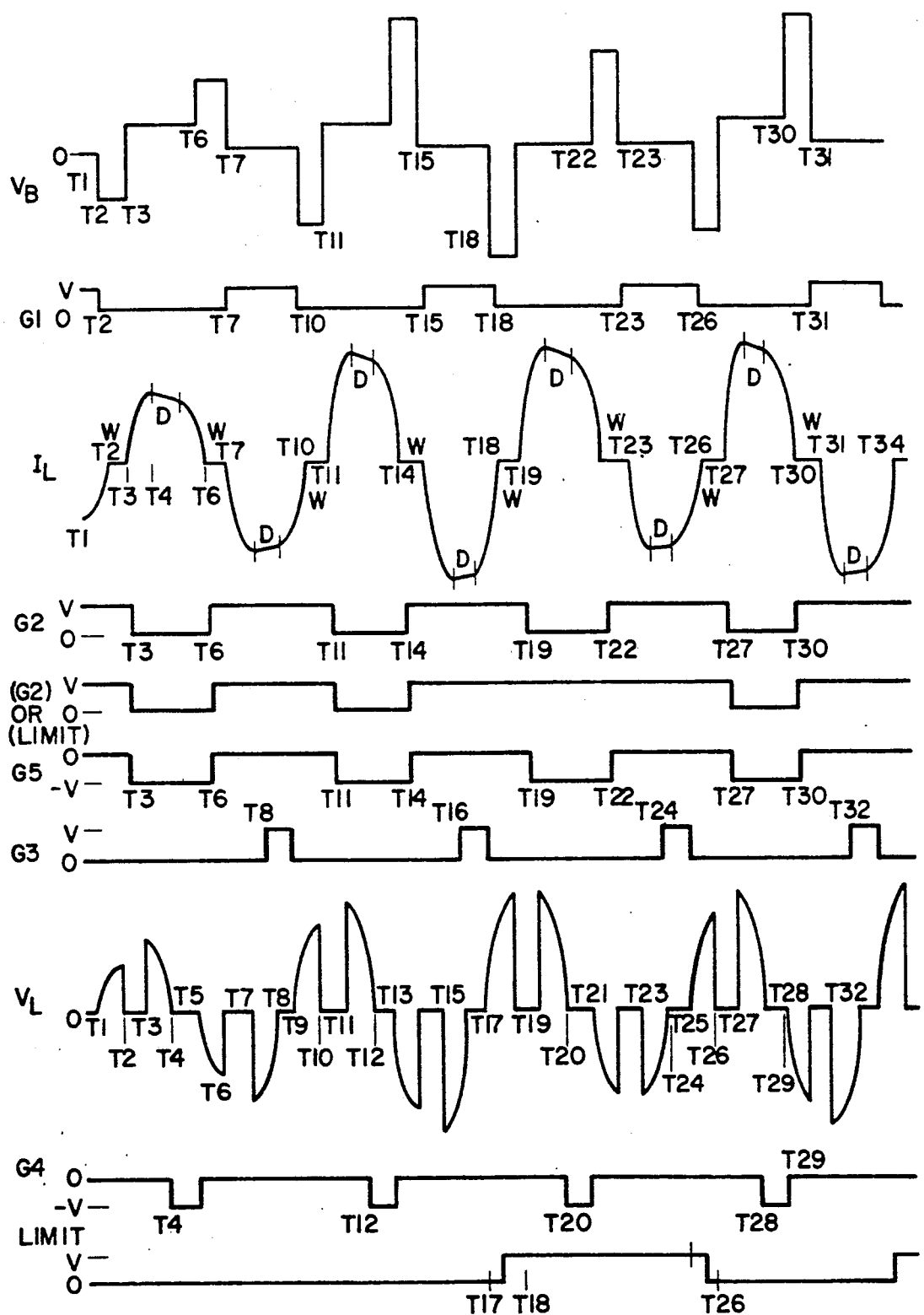
FIG. 4 is a timing diagram for various waveforms of the drive circuit illustrated in FIG. 3.
Figure 5:
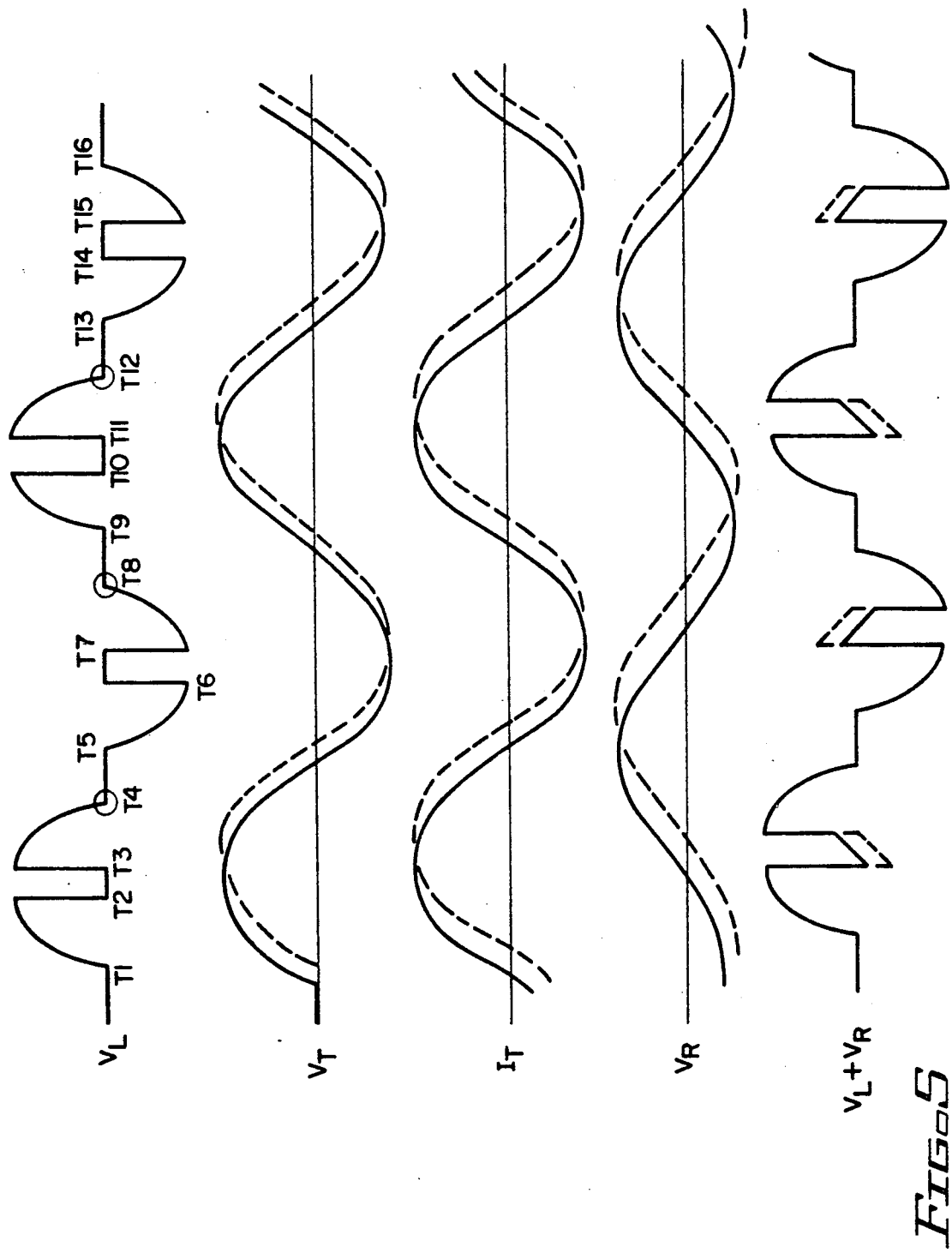
FIG. 5 is a diagram of various current and voltage waveforms of the drive circuit illustrated in FIG. 3.

The operation of the drive circuit 29 is best understood with reference to the timing diagrams of FIG. 4, which illustrate the cyclic drive control signal G for the first transistor 22, the cyclic drive signal G2 for the second transistor 24, the drive signal G3 for the third transistor 56, the drive signal G4 for the fourth transistor 62, the drive signal G5 for the fifth transistor 68, the voltage $V_B$ of the junction point 43, the current $I_L$ and voltage $V_L$ of the sending coil 10, and the limit signal applied to the OR-gate 48. FIG. 5 shows the voltage $V_R$, which is the reflected voltage induced in the drive circuit by the target coil 34, and also the voltage $V_T$ and current $I_T$ of the target coil.

The timing diagrams of FIG. 4 show that, initially at time T1, both G1 and G2 are high and therefore the first transistor 22 is biased on and the second transistor 24 is biased off. Thus, the junction point 43 is connected to ground and the junction voltage $V_B$ is at zero. Due to the operation of the circuit before time T1, a decreasingly negative current is flowing through the sending coil 10, the capacitor 31, the first diode 40, the first transistor 22, through ground, back through the sensing resistor 30, and back to the coil. Therefore, the coil has an increasingly positive voltage $V_L$. At time T2, the coil current $I_L$ has reached zero and the coil voltage $V_L$ has reached its maximum value, $+V$. At this time, a window time interval will be triggered by appropriate operation of drive signals, as explained further below.

Initially, at time T1, all of the transistors except for the first transistor 22 were biased off. When the sending coil current $I_L$ reaches zero at time T2, the first zero crossing detector 78 senses the condition and provides an appropriate signal to the controller 44. The controller, in response, begins the window time interval by dropping the drive voltage G1, biasing off the first transistor 22. Therefore, at time T2 all of the transistors are biased off. With all of the transistors biased off, the terminal of the sending coil closest to the transistors sees the transistors as open switches and "floats," and therefore allows the very small reflected voltage $V_R$ induced in the sending coil 10 by the Changing currents in the target coil 34 to be seen by the phase detector 84, which is connected between the coil 10 and the capacitor 31. The controller makes use of the reflected voltage to adjust the operation of the drive circuit 29, as described further below in conjunction with FIG. 5.

At time T3, after a predetermined time interval, the controller 44 ends the window time interval by dropping the drive voltage G2 for the second transistor 24, biasing on the second transistor. Thus, the junction point 43 is connected to the supply voltage source 16 and the voltage $V_L$ on the sending coil 10 jumps to $+V$. Beginning at time T3, the coil current $I_L$ rises in a sinusoidal fashion for a quarter cycle as the voltage across the capacitor rises, thereby decreasing the voltage $V_L$ on the coil. At time T4, the coil current $I_L$ reaches a peak while the voltage across the coil $V_L$ reaches zero.

That is, all of the voltage from the supply voltage source 16 is across the capacitor 31. The second zero crossing detector 80 is triggered at time T4 by the zero voltage across the coil to begin a delay time interval. The detector is provided with both the coil voltage and the voltage across the resistor 30 to more precisely react at the zero coil voltage. While the voltage across the resistor will be very small, those skilled in the art will appreciate that providing this voltage to the zero crossing detector 80 allows the resistor voltage to be subtracted from the coil voltage, eliminating it from the total and thereby allowing the zero crossing detector to respond when the coil voltage itself truly crosses zero.

At time T4, the controller 44 receives the signal from the second zero crossing detector 80 and begins a delay time interval by dropping the drive voltage G4, biasing on the fourth transistor 62 and producing a low resistance path for current in the positive direction through the fourth transistor and the fourth diode 66 to the sending coil, to allow the current in the sending coil 10 to continue circulating. The controller varies the delay interval to make the drive frequency of the circuit 29 match the resonant frequency of the target system 32 as described below. It should be noted that, although the third transistor 56 is shown as being biased off during this delay time, both the third transistor and fourth transistor could be biased on at the same time, because the current would still flow only through the fourth transistor and fourth diode. The level of the coil current from time T4 to T5 is shown as slightly decreasing to illustrate that various losses in the circuit will slightly decrease the produced current. These losses include diode losses, coupling inefficiencies, and inductance losses. During the delay time interval, the second transistor 24 has been biased on, but no current was flowing because the right side of the capacitor 31 was held at zero voltage by the fourth transistor 62.

At time T5, the controller 44 ends the delay by biasing off the fourth transistor 62. The resonant energy transfer is continued for another quarter cycle as energy in the sending coil 10 is transferred to the capacitor 31 from time T5 to T6, as illustrated by the sinusoidal decrease in voltage and current for the coil. Therefore, at time T6 the voltage of the junction point 43 can rise above the level of the supply voltage source. When the current $I_L$ of the sending coil 10 has dropped to zero at time T6, the voltage across the sensing resistor 30 goes to zero, thereby triggering the first zero crossing detector 78 and resulting in the controller 44 initiating the next window time interval.

During the window time interval beginning at time T6, all of the transistors are again biased off by the controller. The terminal of the sending coil 10 closest to the capacitor 31 "floats" and allows the phase detector 84 to see the voltage induced in the sending coil by the changing current in the target coil 34. The phase detector provides an appropriate signal to the controller, which can adjust the delay time interval so as to match the operating frequency of the target coil.

When the controller 44 wants to end the window time interval at time T7, the controller raises the G1 drive signal, thereby biasing on the first transistor 22. When the first transistor is biased on, a current can flow from the first transistor, through ground, through the sensing resistor 30, the sending coil 10, the capacitor 31, and the first diode 40. Therefore, the capacitor can release the energy that had been stored in it, which was at greater than the supply voltage +V. Therefore, the voltage $V_L$ across the coil can be greater than −V, as shown in FIG. 4. The circuit can continue to operate in this way, swinging above the supply voltage, limited by the quality factor Q of the circuit, as described below. When the capacitor voltage has reached zero, all of the energy from the capacitor has been released into the circuit and the coil voltage $V_L$ will be at zero, as shown in the timing diagram at time T8.

At time T8, the current is flowing in the negative direction, and therefore the third transistor 56 will be used to short the sending coil 10 rather than the fourth transistor 62 used previously. Therefore, the controller 44 triggers another delay time interval by raising the drive signal G3, biasing on the third transistor 56. Current will continue to circulate from the coil 10 through the third diode 60 and the third transistor 56 back to the coil while the delay lasts. At time T9 the controller will drop the G3 drive signal, biasing the third transistor off, and energy will transfer from the inductor back into the capacitor with an opposite polarity. That is, the current will be decreasingly negative, moving toward the positive. When the current reaches zero at time T10, the first zero crossing detector 78 senses the condition and provides an appropriate signal to the controller 44. The controller in response begins the window interval by dropping the G1 drive signal, biasing the first transistor off. Thus, it can be seen that window time intervals are achieved by biasing off all of the transistors, while delay time intervals are achieved by shorting the sending coil 10 to the ground 12.

FIG. 5 shows the waveforms for the drive and reflected voltages $V_L$ and $V_R$, respectively, drawn as solid lines where the drive frequency of the sending coil circuit 29 matches the resonant frequency of the target coil circuit 32, and shows the waveforms as a dashed line where the driving frequency is too high. The total voltage across the sending coil is shown in FIG. 5 as the voltage $V_L + V_R$, or the sum of the driving voltage and the reflected voltage. That is, the coil voltage $V_L$ is the voltage caused by the drive circuitry 29 and is what would be seen if no receiving circuit 32 was inductively coupled, and the reflected voltage $V_R$ is the voltage induced in the sending coil by the changing currents in the target coil circuit 32. Although always present, the reflected voltage is not readily observable unless all of the transistors are biased off. Unlike the $V_L$ waveform illustrated in FIG. 4, the $V_L$ waveform of FIG. 5 is shown in an idealized form, having fluctuations in the voltage level that are symmetric about zero. This is done for purposes of simplicity in viewing the combined $V_L + V_R$ voltage waveforms.

The circuit illustrated in FIG. 3 will transfer energy with each cycle, building up the energy transferred between the sending coil 10 and the capacitor 31 as described above until the voltage at the junction 43 will swing well beyond the supply voltage and ground. The peak value will be limited by a circuit characteristic known as the quality factor Q, known to those skilled in the art. The peak voltage ultimately reached at the junction will be (2Q) times the supply voltage (+V) divided by the constant PI, or (2Q)(+V)/(PI). While switching losses, diode voltage drop, and loading from the target circuit will add to the losses, the ultimate peak reached could still be a very large number. The fifth transistor 68 and the LIMIT signal produced by the controller 44 control the amplitude reached, connecting the sending coil 10 and capacitor 31 with ground 12 instead of the supply voltage source 16. The control scheme to limit the amplitude is similar to that described in the co-pending application entitled Piezoelectric Driver Using Resonant Energy Transfer, by the same inventor herein. This co-pending application Ser. No. 07/575,922 filed Aug. 8, 1990, is incorporated herein by this reference. More specifically, and using the circuit of FIG. 3 and the timing diagram in FIG. 4 to illustrate the control mechanism, it is observed that the voltage $V_L$ goes over the predetermined threshold at a point in time between T17 and T18. The peak detector 86 monitors $V_L$ via line 82 and causes the LIMIT signal 50 to go high from 0 to $+V$. This causes line 54, the output of OR gate 48, to remain high regardless of the state of G2, the signal ON line 52. Accordingly, transistor 24 is maintained nonconductive (OFF state), thereby preventing the transfer of energy or current from the supply 16 which would have otherwise occurred if transistor 24 was conductive (ON state).

Instead, when G2 drops to 0 volts at time T19, transistor 68 and diode 72 conduct and current flows from the inductor 10 through the capacitor 31, diode 72, transistor 68, ground 12 and sensing resistor 30 back to the inductor 10. There is no increase in the energy stored in the system during this part of the cycle and the peak value of voltage $V_L$ at T19 is slightly lower than it had been at T18. This drop is a deviation from the pattern shown in the cycles illustrated heretofore where the instantaneous voltage across the inductor 10 was increased in magnitude by $+V$ after every "zero current" pause. Using only transistors 68 and 22 to conduct current in the tuned circuit means that the energy can decay roughly as it does in a passive RLC circuit. The peak voltage across the inductor 10 at time T23 is similarly slightly lower than it had been at time T22 because of this decay. In the example illustrated, the peak detector 86 senses that $V_L$ has fallen too low again at some point in time between T25 and T26 and the LIMIT signal 50 drops again to allow the circuitry to once again increment the energy stored in the resonant circuit.

The interaction of the second transistor 24, the fifth transistor 68, the controller 44, and the losses described above are illustrated in the FIG. 4 timing diagram for the voltage $V_L$ of the sending coil 10 and the drive signals produced by the controller 44. At time T17, for example, the coil voltage is rising and reaches its peak at time T18 when the coil current $I_L$ reaches zero. Just before time T18, however, the coil voltage $V_L$ reaches a value greater than a predetermined maximum and triggers an output from the peak detector 86 to the controller 44. Other suitable signaling mechanisms can be used, however, such as maximum coil current or magnetic field strength.

When the coil voltage $V_L$ exceeds the predetermined maximum, just prior to time T18, the controller produces the LIMIT signal to bias off the second transistor 24. Thus, at time T19, when the signal G2 drops to bias on the second transistor and fifth transistor 68, the operation of the OR-gate 48 with the LIMIT signal biases the second transistor off, while the fifth transistor is left biased on. Therefore, a current can continue to flow through the capacitor 31, the sending coil 10, the sensing resistor 30, through ground, through the fifth transistor 68, and the fifth diode 72. This prevents the coil voltage and current from increasing to levels greater than the desired peak. The diagram in FIG. 4 also shows that when the coil voltage decreases below the desired maximum, such as at time T25, the LIMIT signal is again dropped, thus allowing the second transistor 24 to again be biased on and off with the signal G2 as with the usual operation of the circuit described above.

If the target coil 34 is near a relatively large amount of metal, such as where the target coil is located within a metal pacemaker case, the metal will introduce a phase shift in the reflected voltage $V_R$ in addition to the shifts caused by any inductance changes and resulting mistuning from age, physical orientation, and so forth. Those skilled in the art will appreciate that this can be taken into account when designing the phase detector 84. For example, in the case of extremely large phase shifts, or where the phase shift is variable, the drive signals can be stopped for one or more cycles rather than for a narrow window or delay period. This can be done periodically with a suitably low duty cycle, and allows a frequency detector circuit to be substituted for the phase detector shown.

While the present invention has been described with respect to preferred embodiments, it is to be understood that variations may occur to those skilled in the art. The particular components selected and their interconnections, for example, can be varied without departing from the teachings of the present invention. The controller can be selected to respond to any condition that corresponds to the occurrence of the maximum load voltage desired, such as maximum power output or drug pump pressure. The invention, therefore, should not be seen as limited to the particular apparatus described herein, but it should be understood that the present invention has wide applicability with respect to the resonant piezoelectric driver circuits. Such alternative configurations can be achieved by those skilled in the art in view of the description above.

What is claimed is:

1. A drive circuit for inductively driving a target coil, the target coil connected to a capacitive element to form a target L-C circuit having a first resonant frequency and a corresponding first resonant cycle time, the drive circuit comprising:
   a supply voltage source;
   a sending coil inductively coupled to the target coil, the sending coil connected to a capacitive element to form a sending L-C circuit having a second resonant frequency greater than the first resonant frequency, the sending L-C circuit being driven by the supply voltage source; and
   control means for periodically connecting the supply voltage source to the sending coil, such that the supply voltage drives the sending coil for inducing cyclical voltage across the sending coil and a cyclical current through the sending coil, and for disconnecting the supply voltage source from the sending coil and connecting the sending coil to a reference potential after a time interval approximately equal to one-half of the first resonant cycle time;
   wherein the frequency of the cyclical voltage induced across the sending coil is controlled by the control means to be substantially the same as the first resonant frequency.

2. The drive circuit according to claim 1, wherein the control means comprises a pair of transistors coupled in series circuit configuration, the drains of the transistors being connected together at a common point, the source of one transistor coupled to the supply voltage source, the source of the other transistor being coupled to ground, the sending coil and capacitive element being connected in series circuit arrangement between the common point and ground, a pair of diodes being connected in series circuit arrangement coupled between the supply voltage source and ground, the point of connection between the diodes being coupled to the capacitive element;

and drive means for producing a cyclical drive voltage having a predetermined frequency, the drive means being connected to the gate of each transistor, wherein the drive voltage controls the state of the transistors such that when one of the transistors of the pair is conductive, the other one of the pair is nonconductive.

3. A drive circuit for inductively driving a target coil, the target coil connected to a capacitive element to form a target L-C circuit having a first resonant frequency and a corresponding first resonant cycle time, the drive circuit comprising:
 a supply voltage source;
 a reference source;
 a pair of complementary MOS field effect transistors coupled in series circuit configuration, the drains of the transistors being coupled together through a pair of series connected diodes, the source of one transistor being connected to the supply voltage source, the source of the other transistor of the pair being connected to the reference source, a first capacitor (C), a sending coil (L) and a resistor (R) connected together to form a series CLR circuit, the series CLR circuit coupled between the series connected diodes and the reference source, the sending coil being inductively coupled to the target coil; and
 controller means connected to the gate of each transistor, the controller means for producing a cyclical drive voltage having a predetermined frequency for controlling the state of the transistors.

4. The drive circuit according to claim 3, further comprising a peak voltage limiter for limiting the voltage across the sending coil comprising;
 a peak detector coupled to the sending coil for detecting the voltage across the sending coil; and
 means responsive to the peak detector for decoupling the CLR circuit from the supply voltage source and coupling it to the reference source when the sending coil voltage exceeds a predetermined limit.

5. The drive circuit according to claim 4, wherein the means for decoupling further comprises:
 a third transistor coupled between the reference source and the CLR circuit, the third transistor being controlled by the controller, wherein the controller renders the third transistor conductive to couple the CLR circuit to the reference source when the voltage across the sending coil exceeds a predetermined limit.

6. The drive circuit according to claim 5, further comprising:
 a first zero crossing detector for detecting when the sending coil current equals zero, the first zero crossing detector being coupled to the controller, wherein the controller commences a window time interval of a predetermined duration when a zero sending coil current is detected, and wherein during such interval any reflected voltage induced in the sending coil by the target coil is sensed.

7. The drive circuit, according to claim 6, wherein the controller renders all transistors of the drive circuit nonconductive during the window time interval.

8. The drive circuit, according to claim 6, further comprising:
 a second zero crossing detector for detecting a zero voltage across the sending coil, the second zero crossing detector being coupled to the controller, wherein the controller maintains a constant current through the sending coil for a predetermined time with a zero voltage is detected across the sending coil.

9. The drive circuit, according to claim 8, wherein the controller commences a delay time interval corresponding to the predetermined time, the cyclical drive voltage being a function of the delay time interval, and wherein the drive circuit further comprises phase detector means for detecting the phase of the voltage induced in the sending coil relative to the current in the sending coil, the phase detector being coupled to the controller such that the controller adjusts the delay time interval for maintaining the drive voltage at the target circuit resonant frequency.

10. A method for resonantly coupling a sending coil to a target coil L-C circuit for inductive energy transfer comprising the steps of:
 providing a sending coil L-C circuit having a resonant frequency greater than the resonant frequency of the target coil L-C circuit;
 providing switching means for alternately connecting a supply voltage source and a reference potential to the sending coil L-C circuit;
 connecting the supply voltage source to the sending coil for a variable time interval that is substantially equal to one-half the cycle time of the target coil L-C circuit resonant frequency; and
 disconnecting the supply voltage source from the sending coil and connecting the sending coil to the reference potential for a variable time interval that is substantially equal to one-half the cycle time of the target coil circuit.

11. A method for driving a sending coil with a supply voltage to inductively transfer electrical power to a target coil and capacitor, the sending coil and target coil having respective coil currents, comprising the steps of:
 providing a capacitor in series with the sending coil such that the resonant frequency of the sending coil and capacitor is greater than the resonant frequency of the target coil and capacitor;
 providing switching means to alternately switch the sending coil and its capacitor between the supply voltage and a reference potential; and
 connecting the supply voltage to the sending coil and its capacitor for a time interval substantially equal to one-half the cycle time of the resonant frequency of the target coil and its capacitor; and
 switching the sending coil and its capacitor from the supply voltage to the reference potential for a time interval substantially equal to one-half the cycle time of the resonant frequency of the target coil and its capacitor.

12. A method as recited in claim 11, wherein the step of providing switching means includes:
 providing zero crossing detector means for detecting when the current through the sending coil reaches zero; and
 providing phase detector means for detecting the phase difference between the voltage across the sending coil and a voltage induced in the sending coil from changing currents in the target coil.

13. A method as recited in claim 12, wherein the step of providing phase detector means includes providing means for creating a delay time interval to let the sending coil current idle when the sending coil voltage is at zero.

14. A drive circuit, for inductively driving a target coil connected with a capacitive element to form a target coil L-C circuit having a target coil L-C circuit resonant frequency, comprising:
- a supply voltage source;
- a sending coil inductively coupled to the target coil;
- a first pair of transistors coupled together in series circuit fashion, one of the transistors of the first pair being coupled to the supply voltage source, the other transistor of the first pair being coupled to ground;
- a capacitor (C), the sending coil (L) and a resistor (R) connected together to form a CLR resonant circuit, the CLR resonant circuit coupled between the first pair of transistors and ground;
- a second pair of transistors coupled to the sending coil and ground;
- a controller for controlling the conductive state of each transistor, the controller for providing a cyclical drive signal to the first pair of transistors for driving the CLR resonant circuit at a frequency substantially equal to the target coil L-C circuit resonant frequency; and
- phase detector means for detecting any phase difference between the voltage across the sending coil and the voltage induced in the target coil and providing thereby a phase signal representative of such difference, the controller further controlling the conduction time of the second pair of transistors as a function of the phase signal and correspondingly coupling the sending coil to ground driving conduction of the transistors of the second pair, to thereby inductively drive the target coil L-C resonant circuit at the target coil L-C resonant circuit resonant frequency.

15. A drive circuit as recited in claim 14, further comprising:
- a fifth transistor connected at its gate to the controller and between the CLR resonant circuit and ground; and
- peak responding means coupled to the sending coil and the controller for comparing the voltage across the sending coil to a predetermined voltage level and for controlling the conductive state of the fifth transistor to thereby prevent the voltage across the sending coil from exceeding the predetermined value.

16. A drive circuit for inductively driving a target coil, the target coil connected to a capacitive element to form a target coil L-C resonant circuit, having a target coil L-C resonant frequency comprising:
- a supply voltage source, a reference source, a sending coil, inductively coupled to the target coil;
- first transistor means coupled between the supply voltage source and the reference source, the first transistor means having a first input and a first output;
- a controller, coupled to the first input for controlling the conductive state of the first transistor means; and
- a capacitor (C) and the sending coil (L) connected together to form a sending coil L-C resonant circuit coupled between the first output and the reference source, wherein the controller cyclically alternates the conductive state of the first transistor means at a predetermined frequency for inducing a cyclical voltage in the target coil having a frequency substantially equal to the target coil L-C circuit resonant frequency.

17. The drive circuit according to claim 16, further comprising:
- second transistor means having a second input and a second output, the second input port being coupled to the controller, the second output being coupled to the sending coil L-C resonant circuit for periodically connecting the sending coil L-C resonant circuit to the reference source; and
- phase detector means for detecting any phase difference between the voltage of the sending coil and the voltage induced in the target coil and providing thereby a phase signal representative of such difference, the controller further controlling the conductive state of the second transistor means as a function of the phase signal and to thereby inductively drive the target coil L-C resonant circuit at the target coil L-C resonant frequency.

18. The drive circuit according to claim 17, further comprising:
- zero crossing detector means coupled between the sending coil L-C resonant circuit; and
- the controller for commencing an interval of a predetermined duration when a sending coil current of zero value is detected, and wherein during such interval, any reflected voltage and phase thereof induced in the sending coil by the target coil is detected.

19. The drive circuit of claim 18, further comprising:
- a peak detector means coupled between the sending coil L-C resonant circuit and the controller for detecting when the voltage across the sending coil L-C resonant circuit exceeds a predetermined value; and
- third transistor means coupled between the sending coil L-C resonant circuit and the reference source wherein the controller controls the conductive state of the third transistor means in a manner responsive to the peak detector means to prevent the voltage across the sending coil L-C resonant circuit exceeding a predetermined maximum value.

20. The drive circuit according to claim 18, wherein the reference source is ground.

21. The drive circuit according to claim 20, wherein the first transistor means and the second transistor means each comprise:
- a pair of complementary MOS field effect transistors.

22. A drive circuit for inductively driving a target coil connected to a capacitor to form a target coil L-C circuit having a target coil L-C circuit resonant frequency comprising:
- a voltage source;
- a reference potential;
- a sending coil (L) inductively coupled to the target coil;
- first switch means having an output controllably switchable between the voltage source and the reference potential;
- a capacitor (C), the sending coil (L) and a resistor (R) together connected to form a CLR resonant circuit, the resonant circuit coupled to the first switch means output; and a controller for controlling the first switch means output, wherein the controller alternates the first switch means output between the voltage source and the reference potential at a frequency substantially equal to the target coil L-C circuit resonant frequency.

23. The drive circuit according to claim 22, further comprising:

a second switch means having an output controllably switchable to the reference potential, the CLR resonant circuit coupled to the output of the second switch means; and phase detector means for detecting any phase difference between the voltage across the sending coil and the voltage induced in the target coil and providing thereby a phase signal representative of such difference, the controller further controlling the second switch means for switching the output of the second switch means as a function of the phase signal.

24. The drive circuit according to claim 22, further comprising:

third switch means having an output controllably switchable to the reference potential, the CLR resonant circuit being coupled to the output of the third switch means; and peak detector means coupled between the CLR resonant circuit and the controller for detecting when the voltage across the CLR resonant circuit exceeds a predetermined maximum value, wherein the controller controls the third switch means in response to the peak detector means to couple the CLR resonant circuit to the reference potential to thereby prevent the voltage across the CLR resonant circuit from exceeding the predetermined maximum value.

25. The drive circuit according to claim 22, further comprising:

zero crossing detector means coupled to the CLR resonant circuit for detecting when the sending coil current equals zero; and wherein the controller commences an interval of a predetermined duration when a sending coil current of zero value is detected, and wherein during such interval, any reflected voltage and phase thereof induced in the sending coil by the target coil is detected.

26. The drive circuit as in any one of claims 22-25 in which the reference potential is ground.

* * * * *